US011261350B2

(12) United States Patent
Niwa et al.

(10) Patent No.: US 11,261,350 B2
(45) Date of Patent: Mar. 1, 2022

(54) DOUBLE-SIDED PRESSURE-SENSITIVE ADHESIVE TAPE

(71) Applicant: NITTO DENKO CORPORATION, Ibaraki (JP)

(72) Inventors: Masahito Niwa, Ibaraki (JP); Hiroki Kigami, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 49 days.

(21) Appl. No.: 16/247,947

(22) Filed: Jan. 15, 2019

(65) Prior Publication Data

US 2019/0264067 A1  Aug. 29, 2019

(30) Foreign Application Priority Data

Feb. 26, 2018  (JP) ............... JP2018031577

(51) Int. Cl.
*C09J 7/38* (2018.01)
*C09J 7/10* (2018.01)
*C09J 133/08* (2006.01)
*B32B 27/30* (2006.01)
*C09J 133/06* (2006.01)

(52) U.S. Cl.
CPC ............. *C09J 7/385* (2018.01); *B32B 27/308* (2013.01); *C09J 7/10* (2018.01); *C09J 133/066* (2013.01); *C09J 133/08* (2013.01); *B32B 2250/03* (2013.01); *B32B 2250/24* (2013.01); *B32B 2405/00* (2013.01); *C09J 2301/208* (2020.08); *C09J 2301/302* (2020.08); *C09J 2301/40* (2020.08); *C09J 2433/00* (2013.01)

(58) Field of Classification Search
None
See application file for complete search history.

(56) References Cited

U.S. PATENT DOCUMENTS

| 5,814,685 | A  | * | 9/1998  | Satake ............... C09D 11/326 523/201 |
| 7,070,051 | B2 | * | 7/2006  | Kanner ........... A61B 17/06133 206/382 |
| 7,446,158 | B2 |   | 11/2008 | Okamoto et al. |
| 7,625,990 | B2 |   | 12/2009 | Wakabayashi et al. |
| 7,763,673 | B2 |   | 7/2010  | Okamoto et al. |

(Continued)

FOREIGN PATENT DOCUMENTS

| CN | 1950459   A | 4/2007 |
| CN | 103013367 A | 4/2013 |

(Continued)

OTHER PUBLICATIONS

Aldrich Data Sheet (Year: 2019).*

(Continued)

*Primary Examiner* — Frank D Ducheneaux
(74) *Attorney, Agent, or Firm* — Sughrue Mion, PLLC (57) ABSTRACT

Provided is a novel double-sided pressure-sensitive adhesive tape that has excellent impact resistance and preferably further has excellent oil resistance. The double-sided pressure-sensitive adhesive tape has a local maximum value of a loss tangent tan δ of 1.5 or more, and a temperature at which the local maximum value is obtained, of from −30° C. to 0° C.

6 Claims, 1 Drawing Sheet

(56) References Cited

U.S. PATENT DOCUMENTS

| | | | |
|---|---|---|---|
| 7,863,182 B2 * | 1/2011 | Matsumura | C09J 7/20 438/628 |
| 7,893,170 B2 | 2/2011 | Wakioka et al. | |
| 7,910,681 B2 | 3/2011 | Wakioka et al. | |
| 7,973,108 B2 | 7/2011 | Okamoto et al. | |
| 10,836,937 B2 | 11/2020 | Suzuki et al. | |
| 2005/0208736 A1 | 9/2005 | Matsumura et al. | |
| 2005/0211588 A1 | 9/2005 | Kanner et al. | |
| 2007/0219299 A1 | 9/2007 | Okamoto et al. | |
| 2007/0287780 A1 | 12/2007 | Wakabayashi et al. | |
| 2008/0033087 A1 | 2/2008 | Okamoto et al. | |
| 2008/0076878 A1 | 3/2008 | Wakioka et al. | |
| 2008/0194773 A1 | 8/2008 | Wakioka et al. | |
| 2008/0287636 A1 | 11/2008 | Wakabayashi et al. | |
| 2008/0319152 A1 | 12/2008 | Okamoto et al. | |
| 2011/0028583 A1 | 2/2011 | Smith et al. | |
| 2012/0171915 A1 | 7/2012 | Bartholomew et al. | |
| 2012/0277341 A1 * | 11/2012 | Smith | C09J 133/08 522/64 |
| 2013/0078463 A1 | 3/2013 | Okamoto et al. | |
| 2014/0193598 A1 * | 7/2014 | Traser | C09J 133/02 428/41.3 |
| 2015/0267088 A1 | 9/2015 | Bogner et al. | |
| 2016/0369136 A1 | 12/2016 | Suzuki et al. | |

FOREIGN PATENT DOCUMENTS

| | | |
|---|---|---|
| CN | 105238283 A | 1/2016 |
| CN | 106010328 A | 10/2016 |
| CN | 106256840 A | 12/2016 |
| CN | 107001874 A | 8/2017 |
| JP | 9-249838 A | 9/1997 |
| JP | 2003-165964 A | 6/2003 |
| JP | 2004-59853 A | 2/2004 |
| JP | 2005-187513 A | 7/2005 |
| JP | 2013-142132 A | 7/2013 |
| JP | 2015-120876 A | 7/2015 |

OTHER PUBLICATIONS

Notice of Reasons for Refusal dated Aug. 17, 2021 by Japanese Patent Office in Application No. 2018-031577.

Notification of First Office Action dated Sep. 29, 2021 from the China National Intellectual Property Administration in Chinese Application No. 201910142300.6.

A. N. Borkova et al., "Impact Resistance of Adhesive Composites", Polymer Science, 2007, vol. 49, No. 2, pp. 109-111 (3 pages total).

Jintao Peng et al., "Preparation of Polyurethane Foam Pressure Sensitive Adhesive by Chemical Foaming Method", China Adhesives, 2015, vol. 24, No. 3 (13 pages total).

* cited by examiner

DOUBLE-SIDED PRESSURE-SENSITIVE ADHESIVE TAPE

This application claims priority under 35 U.S.C. Section 119 to Japanese Patent Application No. 2018-031577 filed on Feb. 26, 2018, which is herein incorporated by references.

BACKGROUND OF THE INVENTION

1. Field of the Invention

The present invention relates to a double-sided pressure-sensitive adhesive tape.

2. Description of the Related Art

In recent years, along with a trend of the sophistication of various kinds of performance of a mobile device, the sophistication of various kinds of performance of various constituent members adopted in the mobile device has been required. In the mobile device, a double-sided pressure-sensitive adhesive tape is sometimes adopted for the bonding of a casing or the like. The sophistication of various kinds of performance of the double-sided pressure-sensitive adhesive tape has also been required in recent years.

There is a risk in that the mobile device falls depending on its use form. Accordingly, a mobile device having high impact resistance has been required. An impact-absorbing member is sometimes arranged outside the casing of the mobile device for improving the impact resistance of the mobile device. However, in such form, the size of the mobile device may increase or its design property may be impaired.

In view of the foregoing, it is desired that excellent impact resistance be imparted to the double-sided pressure-sensitive adhesive tape that may be arranged in the mobile device.

A double-sided pressure-sensitive adhesive sheet having impact resistance has recently been reported (Japanese Patent Application Laid-open No. 2015-120876). The double-sided pressure-sensitive adhesive sheet includes a base material made of a foam as an essential component for expressing the impact resistance. However, when the foam is extended to a certain extent or more, or a force is applied thereto, the foam is cut to have a smaller area or to become thinner. As a result, there is a problem in that the cell portions of the foam occupy a large part of an adhesion portion between the sheet and an adherend to reduce an adhesive property therebetween.

In addition, the mobile device may be typically used under a state in which a bare hand is always in contact therewith. Accordingly, when the mobile device is continuously used, there is a risk in that sebum migrates into its casing to permeate the double-sided pressure-sensitive adhesive tape arranged in the mobile device, thereby swelling the double-sided pressure-sensitive adhesive tape.

In view of the foregoing, it is desired that excellent oil resistance be imparted to the double-sided pressure-sensitive adhesive tape that may be arranged in the mobile device.

SUMMARY OF THE INVENTION

An object of the present invention is to provide a novel double-sided pressure-sensitive adhesive tape that has excellent impact resistance and preferably further has excellent oil resistance.

According to one embodiment of the present invention, there is provided a double-sided pressure-sensitive adhesive tape, which has a local maximum value of a loss tangent tan $\delta$ of 1.5 or more, and a temperature at which the local maximum value is obtained of from −30° C. to 0° C.

In one embodiment, the double-sided pressure-sensitive adhesive tape of the present invention has a thickness of 100 µm or more.

In one embodiment, the double-sided pressure-sensitive adhesive tape of the present invention includes a plurality of pressure-sensitive adhesive layers.

In one embodiment, the double-sided pressure-sensitive adhesive tape of the present invention includes a pressure-sensitive adhesive layer (A) formed from a pressure-sensitive adhesive composition (C-a) containing, as a base polymer, an acrylic polymer (P-a) obtained by polymerizing monomer components (M-a) containing an alicyclic structure-containing acrylic monomer as an essential component.

In one embodiment, a content of the alicyclic structure-containing acrylic monomer in the monomer components (M-a) is from 1 wt % to 30 wt %.

In one embodiment, the double-sided pressure-sensitive adhesive of the present invention includes 3 or more pressure-sensitive adhesive layers, and the pressure-sensitive adhesive layer (A) is formed as a layer excluding an outermost layer.

In one embodiment, the double-sided pressure-sensitive adhesive tape of the present invention includes a pressure-sensitive adhesive layer (B) formed from a pressure-sensitive adhesive composition (C-b) containing, as a base polymer, an acrylic polymer (P-b) obtained by polymerizing monomer components (M-b) containing an alkyl (meth)acrylate as an essential component.

In one embodiment, a content of the alkyl (meth)acrylate in the monomer components (M-b) is from 30 wt % to 90 wt %.

In one embodiment, the alkyl (meth)acrylate includes butyl acrylate.

In one embodiment, the double-sided pressure-sensitive adhesive tape of the present invention includes 3 or more pressure-sensitive adhesive layers, and the pressure-sensitive adhesive layer (B) is formed as an outermost layer.

According to the present invention, the novel double-sided pressure-sensitive adhesive tape that has excellent impact resistance and preferably further has excellent oil resistance can be provided.

DESCRIPTION OF THE EMBODIMENTS

As used herein, the term "(meth)acryl" means at least one kind selected from an acryl and a methacryl, and the term "(meth)acrylate" means at least one kind selected from an acrylate and a methacrylate.

<<A. Double-Sided Pressure-Sensitive Adhesive Tape>>

A double-sided pressure-sensitive adhesive tape of the present invention has a local maximum value of a loss tangent tan $\delta$ of 1.5 or more, preferably 1.6 or more, more preferably 1.7 or more, still more preferably 1.8 or more, particularly preferably 1.9 or more, most preferably 2.0 or more. When the local maximum value of the loss tangent tan $\delta$ falls within the range, the double-sided pressure-sensitive adhesive tape of the present invention can express excellent impact resistance. When the local maximum value of the loss tangent tan δ deviates from the range, the double-sided pressure-sensitive adhesive tape may be unable to express excellent impact resistance.

The double-sided pressure-sensitive adhesive tape of the present invention has a temperature, at which the local maximum value of the loss tangent tan δ is obtained, of from −30° C. to 0° C., preferably from −30° C. to −5° C., more preferably from −25° C. to −10° C., still more preferably from −25° C. to −13° C., particularly preferably from −25° C. to −15° C., most preferably from −20° C. to −18° C. When the temperature at which the local maximum value of the loss tangent tan δ is obtained falls within the range, the double-sided pressure-sensitive adhesive tape of the present invention can express excellent impact resistance. When the temperature at which the local maximum value of the loss tangent tan δ is obtained deviates from the range, the double-sided pressure-sensitive adhesive tape may be unable to express excellent impact resistance.

The loss tangent tan δ can be an indicator representing the impact resistance of the tape. A higher value of the loss tangent tan δ and a larger region thereof mean that the tape shows a higher damping effect in a wider temperature region. The vibration frequency of falling impact is around 1,000 Hz, and as the loss tangent tan δ becomes higher in a region around the vibration frequency, the tape can be said to be more excellent in impact resistance. Here, when the vibration frequency is around 1,000 Hz, the temperature at which the local maximum value of the loss tangent tan δ is obtained corresponds to from about −30° C. to about 0° C., and is preferably from −30° C. to −5° C., more preferably from −25° C. to −10° C., still more preferably from −25° C. to −13° C., particularly preferably from −25° C. to −15° C., most preferably from −20° C. to −18° C.

The thickness of the double-sided pressure-sensitive adhesive tape of the present invention is preferably 100 μm or more, more preferably 120 μm or more, still more preferably 140 μm or more, particularly preferably 160 μm or more, most preferably 180 μm or more. An upper limit for the thickness of the double-sided pressure-sensitive adhesive tape of the present invention is preferably 500 μm or less, more preferably 450 μm or less, still more preferably 400 μm or less, particularly preferably 350 μm or less, most preferably 300 μm or less. When the thickness of the double-sided pressure-sensitive adhesive tape of the present invention falls within the range, the double-sided pressure-sensitive adhesive tape of the present invention can express excellent impact resistance. When the thickness of the double-sided pressure-sensitive adhesive tape of the present invention deviates from the range, the double-sided pressure-sensitive adhesive tape may be unable to express excellent impact resistance.

The double-sided pressure-sensitive adhesive tape of the present invention includes one or more pressure-sensitive adhesive layers, and preferably includes a plurality of pressure-sensitive adhesive layers. When the double-sided pressure-sensitive adhesive tape of the present invention includes a plurality of pressure-sensitive adhesive layers, the double-sided pressure-sensitive adhesive tape of the present invention preferably includes 3 to 10 pressure-sensitive adhesive layers, more preferably includes 3 to 8 pressure-sensitive adhesive layers, still more preferably includes 3 to 5 pressure-sensitive adhesive layers, particularly preferably includes 3 or 4 pressure-sensitive adhesive layers, and most preferably includes 3 pressure-sensitive adhesive layers. When the double-sided pressure-sensitive adhesive tape of the present invention includes such construction, the effects of the present invention can be further expressed. In addition, when the double-sided pressure-sensitive adhesive tape of the present invention includes 3 pressure-sensitive adhesive layers, the 2 outside layers of the 3 layers are preferably pressure-sensitive adhesive layers having the same composition.

The double-sided pressure-sensitive adhesive tape of the present invention may include any appropriate other layer in addition to the pressure-sensitive adhesive layer to such an extent that the effects of the present invention are not impaired.

The double-sided pressure-sensitive adhesive tape of the present invention is preferably formed of a plurality of pressure-sensitive adhesive layers. In this case, the plurality of pressure-sensitive adhesive layers are preferably 3 to 10 pressure-sensitive adhesive layers, more preferably 3 to 8 pressure-sensitive adhesive layers, still more preferably 3 to 5 pressure-sensitive adhesive layers, particularly preferably 3 or 4 pressure-sensitive adhesive layers, most preferably 3 pressure-sensitive adhesive layers. In addition, when the double-sided pressure-sensitive adhesive tape of the present invention is formed of 3 pressure-sensitive adhesive layers, the 2 outside layers of the 3 layers are preferably pressure-sensitive adhesive layers having the same composition.

Figure 1:
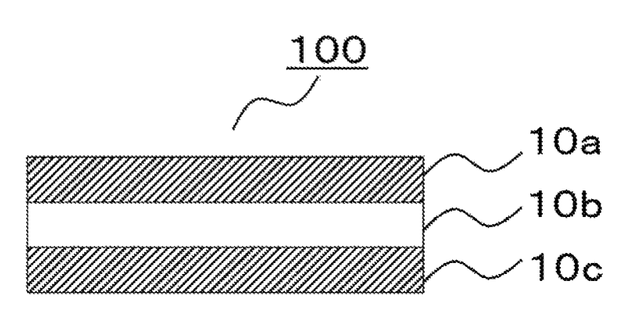
FIG. 1 is a schematic sectional view of a double-sided pressure-sensitive adhesive tape according to one embodiment of the present invention.

FIG. 1 is a schematic sectional view of a double-sided pressure-sensitive adhesive tape according to one embodiment of the present invention. In FIG. 1, a double-sided pressure-sensitive adhesive tape 100 is formed of 3 pressure-sensitive adhesive layers, and includes a pressure-sensitive adhesive layer 10a, a pressure-sensitive adhesive layer 10b, and a pressure-sensitive adhesive layer 10c.

Any appropriate release liner may be arranged on the surface of the pressure-sensitive adhesive layer for, for example, protecting the tape until the tape is used to such an extent that the effects of the present invention are not impaired. Examples of the release liner include: a release liner obtained by subjecting the surface of a base material (liner base material), such as paper or a plastic film, to a silicone treatment; and a release liner obtained by laminating a polyolefin-based resin on the surface of a base material (liner base material), such as paper or a plastic film. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film. The plastic film serving as the liner base material is preferably a polyethylene film.

The thickness of the release liner is preferably from 1 μm to 500 μm, more preferably from 3 μm to 450 μm, still more preferably from 5 μm to 400 μm, particularly preferably from 10 μm to 300 μm.

The pressure-sensitive adhesive strength of the double-sided pressure-sensitive adhesive tape of the present invention is preferably from 5,000 mN/10 mm to 20,000 mN/10 mm, more preferably from 6,000 mN/10 mm to 19,000 mN/10 mm, still more preferably from 7,000 mN/10 mm to 18,000 mN/10 mm, particularly preferably from 8,000 mN/10 mm to 17,000 mN/10 mm. When the pressure-sensitive adhesive strength of the double-sided pressure-sensitive adhesive tape of the present invention falls within the range, a function as a double-sided pressure-sensitive adhesive tape can be sufficiently expressed.

<A-1. Pressure-Sensitive Adhesive Layer (A)>

The double-sided pressure-sensitive adhesive tape of the present invention preferably includes a pressure-sensitive adhesive layer (A) formed from a pressure-sensitive adhesive composition (C-a) containing, as a base polymer, an acrylic polymer (P-a) obtained by polymerizing monomer components (M-a) containing an alicyclic structure-containing acrylic monomer as an essential component.

The pressure-sensitive adhesive layer (A) is formed from the pressure-sensitive adhesive composition (C-a) by any appropriate method. Examples of such method include: a method (direct method) involving applying the pressure-sensitive adhesive composition (C-a) serving as a formation material for the pressure-sensitive adhesive layer onto any appropriate base material (e.g., a base material film), and drying the composition as required, to form the pressure-sensitive adhesive layer on the base material; and a method (transfer method) involving applying the pressure-sensitive adhesive composition (C-a) to a surface having releasability (release surface), and drying the composition as required, to form the pressure-sensitive adhesive layer on the surface having releasability (release surface), and transferring the pressure-sensitive adhesive layer onto any appropriate base material (e.g., a base material film). The surface having releasability (release surface) is, for example, the surface of the release liner described in the foregoing. A method for such application is, for example, any appropriate application method to such an extent that the effects of the present invention are not impaired. Examples of such application method include roll coating, gravure coating, reverse coating, roll brushing, spray coating, an air knife coating method, and extrusion coating with a die coater or the like. UV irradiation may be performed for curing an applied layer formed by the application.

The drying of the pressure-sensitive adhesive composition may be performed under heating from the viewpoints of, for example, the acceleration of the cross-linking reaction of the composition and an improvement in production efficiency of the tape. A drying temperature may be typically set to, for example, from 40° C. to 150° C., and is preferably from 60° C. to 130° C. After the drying of the pressure-sensitive adhesive composition, aging may be further performed for the purposes of, for example, adjusting the migration of a component in the pressure-sensitive adhesive layer, advancing the cross-linking reaction, and alleviating strain that may be present in the pressure-sensitive adhesive layer.

When the double-sided pressure-sensitive adhesive tape of the present invention includes 3 or more pressure-sensitive adhesive layers, it is preferred that the pressure-sensitive adhesive layer (A) be formed as a layer excluding an outermost layer. For example, when the double-sided pressure-sensitive adhesive tape of the present invention includes 3 pressure-sensitive adhesive layers, the pressure-sensitive adhesive layer (A) is preferably formed as the middle layer in the 3 pressure-sensitive adhesive layers. When the double-sided pressure-sensitive adhesive tape of the present invention includes the pressure-sensitive adhesive layer (A) according to such arrangement, the double-sided pressure-sensitive adhesive tape of the present invention can express more excellent impact resistance.

The thickness of the pressure-sensitive adhesive layer (A) is typically from 10 μm to 1,000 μm. In general, the thickness of the pressure-sensitive adhesive layer (A) is preferably as large as possible only from the viewpoint of an improvement in impact resistance of the tape. However, in consideration of, for example, a possibility that the tape is arranged in a mobile device, for example, the thickness may be from 50 μm to 700 μm, may be from 50 μm to 500 μm, or may be from 100 μm to 300 μm.

<A-1-1. Monomer Components (M-a)>

The monomer components (M-a) contain the alicyclic structure-containing acrylic monomer as an essential component. The number of kinds of the alicyclic structure-containing acrylic monomers may be only one, or may be two or more.

The alicyclic structure-containing acrylic monomer is preferably an acrylic monomer having a cyclic aliphatic hydrocarbon structure. The number of carbon atoms of the cyclic aliphatic hydrocarbon structure is preferably 3 or more, more preferably from 6 to 24, still more preferably from 6 to 18, particularly preferably from 6 to 12. Specific examples of such alicyclic structure-containing acrylic monomer include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, isobornyl (meth)acrylate, and dicyclopentanyl (meth)acrylate. Of those alicyclic structure-containing acrylic monomers, cyclohexyl (meth)acrylate is particularly preferred because more excellent impact resistance can be expressed.

The content of the alicyclic structure-containing acrylic monomer in the monomer components (M-a) is preferably from 1 wt % to 30 wt %, more preferably from 3 wt % to 25 wt %, still more preferably from 5 wt % to 20 wt %, particularly preferably from 8 wt % to 17 wt %, most preferably from 10 wt % to 15 wt %. When the content of the alicyclic structure-containing acrylic monomer in the monomer components (M-a) falls within the range, the double-sided pressure-sensitive adhesive tape of the present invention can express more excellent impact resistance.

The monomer components (M-a) may contain an alkyl (meth)acrylate having an alkyl group having 4 to 18 carbon atoms at an ester terminal thereof. The number of kinds of the alkyl (meth)acrylates each having an alkyl group having 4 to 18 carbon atoms at an ester terminal thereof may be only one, or may be two or more. The term "alkyl (meth)acrylate having an alkyl group having 4 to 18 carbon atoms at an ester terminal thereof" as used herein does not include an alkyl (meth)acrylate having an alicyclic structure.

Specific examples of the alkyl (meth)acrylate having an alkyl group having 4 to 18 carbon atoms at an ester terminal thereof include: alkyl (meth)acrylates each having a linear alkyl group having 4 to 18 carbon atoms at an ester terminal thereof, such as n-butyl (meth)acrylate, n-pentyl (meth)acrylate, n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-heptadecyl (meth)acrylate, and n-octadecyl (meth)acrylate; and alkyl (meth)acrylates each having a branched alkyl group having 4 to 18 carbon atoms at an ester terminal thereof, such as t-butyl (meth)acrylate, isobutyl (meth)acrylate, isopentyl (meth)acrylate, t-pentyl (meth)acrylate, neopentyl (meth)acrylate, isohexyl (meth)acrylate, isoheptyl (meth)acrylate, 2-ethylhexyl (meth)acrylate, isooctyl (meth)acrylate, isononyl (meth)acrylate, isodecyl (meth)acrylate, 2-propylheptyl (meth)acrylate, isoundecyl (meth)acrylate, isododecyl (meth)acrylate, isotridecyl (meth)acrylate, isomyristyl (meth)acrylate, isopentadecyl (meth)acrylate, isohexadecyl (meth)acrylate, isoheptadecyl (meth)acrylate, and isostearyl (meth)acrylate. Of those alkyl (meth)acrylates each having an alkyl group having 4 to 18 carbon atoms at an ester terminal thereof, an alkyl (meth)acrylate having a linear alkyl group having 4 to 12 carbon atoms at an ester terminal thereof is preferred because more excellent impact resistance can be expressed, and an alkyl (meth)acrylate having a linear alkyl group having 4 to 8 carbon atoms at an ester terminal thereof is more preferred. Specifically, n-butyl (meth)acrylate is particularly preferred.

The content of the alkyl (meth)acrylate having an alkyl group having 4 to 18 carbon atoms at an ester terminal thereof in the monomer components (M-a) is preferably from 30 wt % to 90 wt %, more preferably from 40 wt % to 80 wt %, still more preferably from 45 wt % to 75 wt %, particularly preferably from 50 wt % to 70 wt %, most preferably from 55 wt % to 65 wt %. When the content of the alkyl (meth)acrylate having an alkyl group having 4 to 18 carbon atoms at an ester terminal thereof in the monomer components (M-a) falls within the range, the double-sided pressure-sensitive adhesive tape of the present invention can express more excellent impact resistance.

The monomer components (M-a) may contain a hydroxy group-containing monomer. The number of kinds of the hydroxy group-containing monomers may be only one, or may be two or more.

Specific examples of the hydroxy group-containing monomer include: hydroxyalkyl (meth)acrylates, such as 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; hydroxyalkylcycloalkane (meth)acrylates, such as (4-hydroxymethylcyclohexyl)methyl (meth)acrylate; and other hydroxy group-containing monomers, such as hydroxyethyl (meth)acrylamide, allyl alcohol, 2-hydroxyethyl vinyl ether, 4-hydroxybutyl vinyl ether, and diethylene glycol monovinyl ether. Of those hydroxy group-containing monomers, a hydroxyalkyl (meth)acrylate is preferred because more excellent impact resistance can be expressed, and a hydroxyalkyl (meth)acrylate having a hydroxyalkyl group having 2 to 6 carbon atoms is more preferred. Specifically, 2-hydroxyethyl (meth)acrylate or 4-hydroxybutyl (meth)acrylate is still more preferred. In addition, a mode in which 2-hydroxyethyl (meth)acrylate and 4-hydroxybutyl (meth)acrylate are used in combination is particularly preferred.

The content of the hydroxy group-containing monomer in the monomer components (M-a) is preferably from 5 wt % to 50 wt %, more preferably from 10 wt % to 40 wt %, still more preferably from 15 wt % to 35 wt %, particularly preferably from 20 wt % to 35 wt %. When the content of the hydroxy group-containing monomer in the monomer components (M-a) falls within the range, the double-sided pressure-sensitive adhesive tape of the present invention can express more excellent impact resistance.

The monomer components (M-a) may contain any appropriate other monomer to such an extent that the effects of the present invention are not impaired. Examples of such other monomer include an alkyl (meth)acrylate having an alkyl group having 1 to 3 carbon atoms at an ester terminal thereof, a carboxyl group-containing monomer, a nitrogen-based cyclic structure-containing monomer, a cyclic ether group-containing monomer, a glycol-based acrylic ester monomer, a styrene-based monomer, an amide group-containing monomer, an amino group-containing monomer, an imide group-containing monomer, a vinyl ether monomer, a silane-based monomer, and a polyfunctional monomer. The number of kinds of such other monomers may be only one, or may be two or more.

Specific examples of the alkyl (meth)acrylate having an alkyl group having 1 to 3 carbon atoms at an ester terminal thereof include methyl (meth)acrylate, ethyl (meth)acrylate, n-propyl (meth)acrylate, and isopropyl (meth)acrylate.

Specific examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Specific examples of the nitrogen-based cyclic structure-containing monomer include: lactam-based vinyl monomers, such as N-vinylpyrrolidone, N-vinyl-ε-caprolactam, and methyl vinylpyrrolidone; vinyl-based monomers each having a nitrogen-containing heterocycle, such as vinylpyridine, vinylpiperidone, vinylpyrimidine, vinylpiperazine, vinylpyrazine, vinylpyrrole, vinylimidazole, vinyloxazole, and vinylmorpholine; and (meth)acrylic monomers each containing a heterocycle, such as a morpholine ring, a piperidine ring, a pyrrolidine ring, or a piperazine ring (e.g., N-acryloylmorpholine, N-acryloylpiperidine, N-methacryloylpiperidine, and N-acryloylpyrrolidine).

Specific examples of the cyclic ether group-containing monomer include: epoxy group-containing monomers, such as glycidyl (meth)acrylate, 3,4-epoxycyclohexylmethyl (meth)acrylate, and 4-hydroxybutyl (meth)acrylate glycidyl ether; and oxetane group-containing monomers, such as 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate.

Specific examples of the glycol-based acrylic ester monomer include polyethylene glycol (meth)acrylate, polypropylene glycol (meth)acrylate, methoxyethylene glycol (meth)acrylate, and methoxypolypropylene glycol (meth)acrylate.

Specific examples of the styrene-based monomer include styrene and α-methylstyrene.

Specific examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Specific examples of the polyfunctional monomer include: ester compounds of polyhydric alcohols and (meth)acrylic acid, such as (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol penta(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri(meth)acrylate, and tetramethylolmethane tri(meth)acrylate; allyl (meth)acrylate; vinyl (meth)acrylate; divinylbenzene; epoxy acrylate; polyester acrylate; urethane acrylate; butyl di(meth)acrylate; and hexyl di(meth)acrylate.

<A-1-2. Acrylic Polymer (P-a)>

Any appropriate production method may be adopted as a method of producing the acrylic polymer (P-a) through the polymerization of the monomer components (M-a) to such an extent that the effects of the present invention are not impaired. Examples of such production method include various kinds of radical polymerization including: solution polymerization; active energy ray polymerization, such as UV polymerization; bulk polymerization; and emulsion polymerization. Any appropriate polymerization conditions may be adopted as polymerization conditions to such an extent that the effects of the present invention are not impaired.

Any appropriate polymerization structure may be adopted as the polymerization structure of the acrylic polymer (P-a)

to be obtained to such an extent that the effects of the present invention are not impaired. Examples of such polymerization structure include a random copolymer, a block copolymer, and a graft copolymer.

Any appropriate additive may be adopted as an additive to be used in the radical polymerization, such as a polymerization initiator, a chain transfer agent, or an emulsifying agent, to such an extent that the effects of the present invention are not impaired.

A polymerization solvent that may be used in the solution polymerization or the like is, for example, ethyl acetate or toluene. The number of kinds of the polymerization solvents may be only one, or may be two or more.

The solution polymerization is performed in a stream of an inert gas, such as nitrogen, after the addition of a polymerization initiator typically under the reaction conditions of a temperature of from about 50° C. to about 70° C., and a time period of from about 5 hours to about 30 hours.

Any appropriate thermal polymerization initiator may be adopted as the polymerization initiator that may be used in the solution polymerization or the like to such an extent that the effects of the present invention are not impaired. The number of kinds of the polymerization initiators may be only one, or may be two or more. Examples of such polymerization initiator include: azo-based initiators, such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine] hydrate (VA-057, manufactured by Wako Pure Chemical Industries, Ltd.); peroxide-based initiators, such as persulfates such as potassium persulfate and ammonium persulfate, di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxy-2-ethyl hexanoate, di(4-methylbenzoyl) peroxide, dibenzoyl peroxide, t-butyl peroxyisobutyrate, 1,1-di(t-hexylperoxy)cyclohexane, t-butyl hydroperoxide, and hydrogen peroxide; and redox-based initiators each obtained by combining a peroxide and a reducing agent, such as a combination of a persulfate and sodium hydrogen sulfite, and a combination of a peroxide and sodium ascorbate.

The usage amount of the polymerization initiator is preferably 1 part by weight or less, more preferably from 0.005 part by weight to 1 part by weight, still more preferably from 0.01 part by weight to 0.7 part by weight, particularly preferably from 0.02 part by weight to 0.5 part by weight with respect to 100 parts by weight of the total amount of the monomer components (M-a) because of, for example, the following reason: the polymerization reaction can be effectively advanced.

Any appropriate chain transfer agent may be adopted as the chain transfer agent to such an extent that the effects of the present invention are not impaired. The number of kinds of the chain transfer agents may be only one, or may be two or more. Examples of such chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol.

The usage amount of the chain transfer agent is preferably 0.1 part by weight or less with respect to 100 parts by weight of the total amount of the monomer components (M-a) because of, for example, the following reason: the polymerization reaction can be effectively advanced.

Any appropriate emulsifying agent may be adopted as the emulsifying agent to such an extent that the effects of the present invention are not impaired. The number of kinds of the emulsifying agents may be only one, or may be two or more. Examples of such emulsifying agent include: anionic emulsifying agents, such as sodium lauryl sulfate, ammonium lauryl sulfate, sodium dodecylbenzenesulfonate, an ammonium polyoxyethylene alkyl ether sulfate, and a sodium polyoxyethylene alkyl phenyl ether sulfate; and nonionic emulsifying agents, such as a polyoxyethylene alkyl ether, a polyoxyethylene alkyl phenyl ether, a polyoxyethylene fatty acid ester, and a polyoxyethylene-polyoxypropylene block polymer.

The usage amount of the emulsifying agent is preferably 5 parts by weight or less, more preferably from 0.3 part by weight to 5 parts by weight, still more preferably from 0.4 part by weight to 3 parts by weight, particularly preferably from 0.5 part by weight to 1 part by weight with respect to 100 parts by weight of the total amount of the monomer components (M-a) from the viewpoints of polymerization stability and mechanical stability.

The acrylic polymer (P-a) may be preferably produced by active energy ray polymerization, such as UV polymerization or electron beam polymerization. The acrylic polymer (P-a) may be more preferably produced by the UV polymerization.

When the UV polymerization is performed, a photopolymerization initiator is preferably used.

Any appropriate photopolymerization initiator may be adopted as the photopolymerization initiator to such an extent that the effects of the present invention are not impaired. The number of kinds of the photopolymerization initiators may be only one, or may be two or more. Examples of such photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzil-based photopolymerization initiator, a benzophenone-based photopolymerization initiator, a ketal-based photopolymerization initiator, a thioxanthone-based photopolymerization initiator, and an acylphosphine oxide-based photopolymerization initiator.

Specific examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one (e.g., a commercial product available under the product name "Irgacure 651" from BASF), and anisole methyl ether.

Specific examples of the acetophenone-based photopolymerization initiator include 1-hydroxycyclohexyl phenyl ketone (e.g., a commercial product available under the product name "Irgacure 184" from BASF), 4-phenoxydichloroacetophenone, 4-t-butyl-dichloroacetophenone, 1-[4-(2-hydroxyethoxy)-phenyl]-2-hydroxy-2-methyl-1-propan-1-one (e.g., a commercial product available under the product name "Irgacure 2959" from BASF), 2-hydroxy-2-methyl-1-phenyl-propan-1-one (e.g., a commercial product available under the product name "DAROCUR 1173" from BASF), and methoxyacetophenone.

Specific examples of the α-ketol-based photopolymerization initiator include 2-methyl-2-hydroxypropiophenone and 1-[4-(2-hydroxyethyl)-phenyl]-2-hydroxy-2-methylpropan-1-one.

A specific example of the aromatic sulfonyl chloride-based photopolymerization initiator is 2-naphthalenesulfonyl chloride.

A specific example of the photoactive oxime-based photopolymerization initiator is 1-phenyl-1,1-propanedione-2-(o-ethoxycarbonyl)-oxime.

A specific example of the benzoin-based photopolymerization initiator is benzoin.

A specific example of the benzil-based photopolymerization initiator is benzil.

Specific examples of the benzophenone-based photopolymerization initiator include benzophenone, benzoylbenzoic acid, 3,3'-dimethyl-4-methoxybenzophenone, polyvinylbenzophenone, and α-hydroxycyclohexyl phenyl ketone.

A specific example of the ketal-based photopolymerization initiator is benzyl dimethyl ketal.

Specific examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, and dodecylthioxanthone.

Specific examples of the acylphosphine-based photopolymerization initiator include bis(2,6-dimethoxybenzoyl)phenylphosphine oxide, bis(2,6-dimethoxybenzoyl) (2,4,4-trimethylpentyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl) (2-methylpropan-1-yl)phosphine oxide, bis(2-methoxybenzoyl) (1-methylpropan-1-yl)phosphine oxide, bis(2,6-diethoxybenzoyl) (2-methylpropan-1-yl)phosphine oxide, bis(2,6-diethoxybenzoyl) (1-methylpropan-1-yl)phosphine oxide, bis(2,6-dibutoxybenzoyl) (2-methylpropan-1-yl)phosphine oxide, bis(2,4-dimethoxybenzoyl) (2-methylpropan-1-yl)phosphine oxide, bis(2,4,6-trimethylbenzoyl) (2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoylbenzylbutylphosphine oxide, 2,6-dimethoxybenzoylbenzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide.

The usage amount of the photopolymerization initiator is preferably 5 parts by weight or less, more preferably from 0.01 part by weight to 5 parts by weight, still more preferably from 0.05 part by weight to 3 parts by weight, particularly preferably from 0.05 part by weight to 1.5 parts by weight, most preferably from 0.1 part by weight to 1 part by weight with respect to 100 parts by weight of the total amount of the monomer components (M-a) from the viewpoint of, for example, the expression of satisfactory polymerizability.

When the UV polymerization is performed, a polyfunctional (meth)acrylate is preferably used.

Any appropriate polyfunctional (meth)acrylate may be adopted as the polyfunctional (meth)acrylate to such an extent that the effects of the present invention are not impaired. The number of kinds of the polyfunctional (meth)acrylates may be only one, or may be two or more. Specific examples of such polyfunctional (meth)acrylate include: ester compounds of polyhydric alcohols and (meth)acrylic acid, such as (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol penta(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri (meth)acrylate, and tetramethylolmethane tri(meth)acrylate; allyl (meth)acrylate; vinyl (meth)acrylate; divinylbenzene; epoxy acrylate; polyester acrylate; urethane acrylate; butyl di(meth)acrylate; and hexyl di(meth)acrylate.

The usage amount of the polyfunctional (meth)acrylate is preferably 5 parts by weight or less, more preferably from 0.01 part by weight to 5 parts by weight, still more preferably from 0.05 part by weight to 3 parts by weight, particularly preferably from 0.05 part by weight to 1.5 parts by weight, most preferably from 0.1 part by weight to 1 part by weight with respect to 100 parts by weight of the total amount of the monomer components (M-a) from the viewpoint of, for example, the expression of satisfactory crosslinkability.

Any appropriate UV polymerization method may be adopted as a method for the UV polymerization to such an extent that the effects of the present invention are not impaired. Such UV polymerization method is, for example, as follows: the monomer components (M-a) are compounded with the photopolymerization initiator, and as required, the polyfunctional (meth)acrylate, and the resultant is irradiated with UV light.

The weight-average molecular weight of the acrylic polymer (P-a) is preferably from 100,000 to 3,000,000, more preferably from 300,000 to 2,000,000, still more preferably from 500,000 to 1,500,000, particularly preferably from 500,000 to 1,000,000 because the double-sided pressure-sensitive adhesive tape of the present invention can express more excellent impact resistance. The weight-average molecular weight is a value measured by gel permeation chromatography (GPC) and calculated in terms of polystyrene. It is difficult to measure the weight-average molecular weight of the acrylic polymer (P-a) obtained by active energy ray polymerization.

<A-1-3. Pressure-Sensitive Adhesive Composition (C-a)>

The pressure-sensitive adhesive composition (C-a) contains the acrylic polymer (P-a) as the base polymer.

The content of the acrylic polymer (P-a) in the pressure-sensitive adhesive composition (C-a) is as follows: when the total amount of the pressure-sensitive adhesive composition (C-a) is set to 100 parts by weight, the content of the acrylic polymer (P-a) is preferably from 50 wt % to 100 wt %, more preferably from 70 wt % to 100 wt %, still more preferably from 90 wt % to 100 wt %, particularly preferably from 95 wt % to 100 wt %, most preferably from 98 wt % to 100 wt %. When the content of the alicyclic polymer (P-a) in the pressure-sensitive adhesive composition (C-a) falls within the range, the double-sided pressure-sensitive adhesive tape of the present invention can express more excellent impact resistance.

The pressure-sensitive adhesive composition (C-a) may contain any appropriate other component to such an extent that the effects of the present invention are not impaired. Examples of such other component include a resin component except the acrylic polymer (P-a), a tackifier, an inorganic filler, an organic filler, metal powder, a pigment, a colorant, a foil-shaped product, a softener, an age resistor, a conductive agent, a UV absorber, an antioxidant, a light stabilizer, a surface lubricant, a leveling agent, a corrosion inhibitor, a heat stabilizer, a polymerization inhibitor, a lubricant, a solvent, and a catalyst.

<A-2. Pressure-Sensitive Adhesive Layer (B)>

The double-sided pressure-sensitive adhesive tape of the present invention preferably includes a pressure-sensitive adhesive layer (B) formed from a pressure-sensitive adhesive composition (C-b) containing, as a base polymer, an acrylic polymer (P-b) obtained by polymerizing monomer components (M-b) containing an alkyl (meth)acrylate as an essential component.

The pressure-sensitive adhesive layer (B) is formed from the pressure-sensitive adhesive composition (C-b) by any appropriate method. Examples of such method include: a method (direct method) involving applying the pressure-sensitive adhesive composition (C-b) serving as a formation material for the pressure-sensitive adhesive layer onto any appropriate base material (e.g., a base material film), and drying the composition as required, to form the pressure-sensitive adhesive layer on the base material; and a method (transfer method) involving applying the pressure-sensitive adhesive composition (C-b) to a surface having releasability (release surface), and drying the composition as required, to form the pressure-sensitive adhesive layer on the surface having releasability (release surface), and transferring the pressure-sensitive adhesive layer onto any appropriate base material (e.g., a base material film). The surface having releasability (release surface) is, for example, the surface of the release liner described in the foregoing. A method for such application is, for example, any appropriate application method to such an extent that the effects of the present invention are not impaired. Examples of such application method include roll coating, gravure coating, reverse coating, roll brushing, spray coating, an air knife coating method, and extrusion coating with a die coater or the like. UV irradiation may be performed for curing an applied layer formed by the application.

The drying of the pressure-sensitive adhesive composition may be performed under heating from the viewpoints of, for example, the acceleration of the cross-linking reaction of the composition and an improvement in production efficiency of the tape. A drying temperature may be typically set to, for example, from 40° C. to 150° C., and is preferably from 60° C. to 130° C. After the drying of the pressure-sensitive adhesive composition, aging may be further performed for the purposes of, for example, adjusting the migration of a component in the pressure-sensitive adhesive layer, advancing the cross-linking reaction, and alleviating strain that may be present in the pressure-sensitive adhesive layer.

When the double-sided pressure-sensitive adhesive tape of the present invention includes 3 or more pressure-sensitive adhesive layers, the pressure-sensitive adhesive layer (B) is preferably formed as an outermost layer. For example, when the double-sided pressure-sensitive adhesive tape of the present invention includes 3 pressure-sensitive adhesive layers, the pressure-sensitive adhesive layer (B) is preferably formed as at least one of the outside layers in the 3 pressure-sensitive adhesive layers. When the double-sided pressure-sensitive adhesive tape of the present invention includes the pressure-sensitive adhesive layer (B) according to such arrangement, the double-sided pressure-sensitive adhesive tape of the present invention can express excellent oil resistance.

The thickness of the pressure-sensitive adhesive layer (B) is preferably from 5 µm to 100 µm, more preferably from 10 µm to 80 µm, still more preferably from 10 µm to 50 µm, particularly preferably from 20 µm to 40 µm. When the thickness of the pressure-sensitive adhesive layer (B) falls within the range, the double-sided pressure-sensitive adhesive tape of the present invention can express more excellent impact resistance and more excellent oil resistance.

<A-2-1. Monomer Components (M-b)>

The monomer components (M-b) contain the alkyl (meth) acrylate as an essential component. The term "alkyl (meth) acrylate" as used herein does not include an alkyl (meth) acrylate having an alicyclic structure.

The content of the alkyl (meth)acrylate in the monomer components (M-b) is preferably from 50 wt % to 95 wt %, more preferably from 60 wt % to 90 wt %, still more preferably from 65 wt % to 85 wt %, particularly preferably from 70 wt % to 85 wt %. When the content of the alkyl (meth)acrylate in the monomer components (M-b) falls within the range, the double-sided pressure-sensitive adhesive tape of the present invention can express more excellent impact resistance and more excellent oil resistance.

The alkyl (meth)acrylate is preferably an alkyl (meth) acrylate having an alkyl group having 1 to 20 carbon atoms at an ester terminal thereof, more preferably an alkyl (meth) acrylate having an alkyl group having 1 to 14 carbon atoms at an ester terminal thereof, still more preferably an alkyl (meth)acrylate having an alkyl group having 1 to 10 carbon atoms at an ester terminal thereof, particularly preferably an alkyl (meth)acrylate having an alkyl group having 2 to 10 carbon atoms at an ester terminal thereof, most preferably an alkyl (meth)acrylate having an alkyl group having 4 to 8 carbon atoms at an ester terminal thereof.

Specific examples of such alkyl (meth)acrylate include: alkyl (meth)acrylates each having a linear alkyl group having 1 to 20 carbon atoms at an ester terminal thereof, such as methyl (meth)acrylate, ethyl (meth)acrylate, n-propyl (meth)acrylate, n-butyl (meth)acrylate, n-pentyl (meth) acrylate, n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth) acrylate, n-tridecyl (meth)acrylate, n-tetradecyl (meth)acrylate, n-pentadecyl (meth)acrylate, n-hexadecyl (meth)acrylate, n-heptadecyl (meth)acrylate, and n-octadecyl (meth) acrylate; and alkyl (meth)acrylates each having a branched alkyl group having 3 to 20 carbon atoms at an ester terminal thereof, such as isopropyl (meth)acrylate, t-butyl (meth) acrylate, isobutyl (meth)acrylate, isopentyl (meth)acrylate, t-pentyl (meth)acrylate, neopentyl (meth)acrylate, isohexyl (meth)acrylate, isoheptyl (meth)acrylate, 2-ethylhexyl (meth)acrylate, isooctyl (meth)acrylate, isononyl (meth) acrylate, isodecyl (meth)acrylate, 2-propylheptyl (meth) acrylate, isoundecyl (meth)acrylate, isododecyl (meth)acrylate, isotridecyl (meth)acrylate, isomyristyl (meth)acrylate, isopentadecyl (meth)acrylate, isohexadecyl (meth)acrylate, isoheptadecyl (meth)acrylate, and isostearyl (meth)acrylate. Of those alkyl (meth)acrylates, an alkyl (meth)acrylate having an alkyl group having 4 to 12 carbon atoms at an ester terminal thereof is preferred because more excellent oil resistance can be expressed, and an alkyl (meth)acrylate having an alkyl group having 4 to 8 carbon atoms at an ester terminal thereof is more preferred. Specifically, n-butyl (meth)acrylate is particularly preferred.

The monomer components (M-b) may contain a carboxyl group-containing monomer. The number of kinds of the carboxyl group-containing monomers may be only one, or may be two or more.

Specific examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid. The carboxyl group-containing monomer is more preferably (meth)acrylic acid, particularly preferably acrylic acid.

The content of the carboxyl group-containing monomer in the monomer components (M-b) is preferably from 0.01 wt % to 20 wt %, more preferably from 3 wt % to 10 wt %, still more preferably from 4 wt % to 8 wt %, particularly preferably from 5 wt % to 6 wt %. When the content of the carboxyl group-containing monomer in the monomer components (M-b) falls within the range, the double-sided pressure-sensitive adhesive tape of the present invention can express more excellent impact resistance and more excellent oil resistance.

The monomer components (M-b) may contain any appropriate other monomer to such an extent that the effects of the present invention are not impaired. Examples of such other monomer include a hydroxy group-containing monomer, an alicyclic structure-containing acrylic monomer, a nitrogen-based cyclic structure-containing monomer, a cyclic ether group-containing monomer, a glycol-based acrylic ester monomer, a styrene-based monomer, an amide group-containing monomer, an amino group-containing monomer, an imide group-containing monomer, a vinyl ether monomer, a silane-based monomer, and a polyfunctional monomer. The number of kinds of such other monomers may be only one, or may be two or more. The examples in the section <A-1-1. Monomer Components (M-a)> may be incorporated for specific examples of such other monomer.

<A-2-2. Acrylic Polymer (P-b)>

Any appropriate production method may be adopted as a method of producing the acrylic polymer (P-b) through the polymerization of the monomer components (M-b) to such an extent that the effects of the present invention are not impaired. Examples of such production method include various kinds of radical polymerization including: solution polymerization; active energy ray polymerization, such as UV polymerization; bulk polymerization; and emulsion polymerization. Any appropriate polymerization conditions may be adopted as polymerization conditions to such an extent that the effects of the present invention are not impaired.

Any appropriate polymerization structure may be adopted as the polymerization structure of the acrylic polymer (P-b) to be obtained to such an extent that the effects of the present invention are not impaired. Examples of such polymerization structure include a random copolymer, a block copolymer, and a graft copolymer.

Any appropriate additive may be adopted as an additive to be used in the radical polymerization, such as a polymerization initiator, a chain transfer agent, or an emulsifying agent, to such an extent that the effects of the present invention are not impaired.

A polymerization solvent that may be used in the solution polymerization or the like is, for example, ethyl acetate or toluene. The number of kinds of the polymerization solvents may be only one, or may be two or more.

The description in the section <A-1-2. Acrylic Polymer (P-a)> may be incorporated for the polymerization initiator that may be used in the solution polymerization or the like.

The description in the section <A-1-2. Acrylic Polymer (P-a)> may be incorporated for the chain transfer agent and the emulsifying agent.

The description in the section <A-1-2. Acrylic Polymer (P-a)> may be incorporated for description when the UV polymerization is performed.

The acrylic polymer (P-b) may be preferably produced by the solution polymerization.

The weight-average molecular weight of the acrylic polymer (P-b) is preferably from 100,000 to 2,000,000, more preferably from 200,000 to 1,000,000, still more preferably from 200,000 to 800,000, particularly preferably from 300,000 to 700,000 because the double-sided pressure-sensitive adhesive tape of the present invention can express more excellent impact resistance. The weight-average molecular weight is a value measured by gel permeation chromatography (GPC) and calculated in terms of polystyrene. It is difficult to measure the weight-average molecular weight of the acrylic polymer (P-b) obtained by active energy ray polymerization.

<A-2-3. Pressure-Sensitive Adhesive Composition (C-b)>

The pressure-sensitive adhesive composition (C-b) contains the acrylic polymer (P-b) as the base polymer.

The content of the acrylic polymer (P-b) in the pressure-sensitive adhesive composition (C-b) is as follows: when the total amount of the pressure-sensitive adhesive composition (C-b) is set to 100 parts by weight, the content of the acrylic polymer (P-b) is preferably from 50 wt % to 99 wt %, more preferably from 55 wt % to 95 wt %, still more preferably from 60 wt % to 90 wt %, particularly preferably from 65 wt % to 88 wt %, most preferably from 70 wt % to 85 wt %. When the content of the alicyclic polymer (P-b) in the pressure-sensitive adhesive composition (C-b) falls within the range, the double-sided pressure-sensitive adhesive tape of the present invention can express more excellent impact resistance and more excellent oil resistance.

The pressure-sensitive adhesive composition (C-b) may contain a rust inhibitor. When the pressure-sensitive adhesive composition (C-b) contains the rust inhibitor, the double-sided pressure-sensitive adhesive tape of the present invention can express more excellent oil resistance.

Any appropriate rust inhibitor may be adopted as the rust inhibitor to such an extent that the effects of the present invention are not impaired. Such rust inhibitor is, for example, an azole-based rust inhibitor. The number of kinds of the rust inhibitors may be only one, or may be two or more.

The azole-based rust inhibitor is preferably a rust inhibitor containing, as an effective component, an azole-based compound which is a five-membered aromatic compound containing 2 or more heteroatoms, and in which at least one of the heteroatoms is a nitrogen atom. Examples of such azole-based compound include: azoles, such as imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, and 1,2,3,4-thiatriazole; derivatives thereof; amine salts thereof; and metal salts thereof.

An example of the derivative of an azole is a compound having a structure containing a fused ring of an azole ring and another ring, specifically, a benzene ring. Specific examples of the derivative of an azole include benzimidazole, benzotriazole (that is, 1,2,3-benzotriazole having a fused structure of an azole ring of 1,2,3-triazole and a benzene ring), and benzothiazole, and derivatives thereof, such as an alkylbenzotriazole (e.g., 5-methylbenzotriazole, 5-ethylbenzotriazole, 5-n-propylbenzotriazole, 5-isobutyl-benzotriazole, or 4-methylbenzotriazole), an alkoxybenzotriazole (e.g., 5-methoxybenzotriazole), an alkylaminobenzotriazole, an alkylaminosulfonylbenzotriazole, mercaptobenzotriazole, hydroxybenzotriazole, nitrobenzotriazole (e.g., 4-nitrobenzotriazole), a halobenzotriazole (e.g., 5-chlorobenzotriazole), a hydroxyalkylbenzotriazole, hydrobenzotriazole, aminobenzotriazole, (substituted aminomethyl)-tolyltriazole, carboxybenzotriazole, an N-alkyl-benzotriazole, bisbenzotriazole, naphthotriazole, mercaptobenzothiazole, and aminobenzothiazole, amine salts thereof, and metal salts thereof. Another example of the derivative of an azole is a derivative of an azole having a non-fused ring structure, for example, a compound having a structure containing a substituent on a non-fused azole ring, such as 3-amino-1,2,4-triazole or 5-phenyl-1H-tetrazole.

The azole-based rust inhibitor is particularly preferably, for example, a benzotriazole-based rust inhibitor containing a benzotriazole-based compound as an effective component. When the benzotriazole-based rust inhibitor containing the benzotriazole-based compound as an effective component is adopted as the azole-based rust inhibitor, the double-sided pressure-sensitive adhesive tape of the present invention can express more excellent oil resistance.

Specific examples of the benzotriazole-based compound include 1,2,3-benzotriazole, 5-methylbenzotriazole, 4-methylbenzotriazole, and carboxybenzotriazole.

The content of the azole-based rust inhibitor (e.g., the benzotriazole-based rust inhibitor) in the pressure-sensitive adhesive composition (C-b) is preferably from 0.01 part by weight to 7 parts by weight, more preferably from 0.05 part by weight to 6 parts by weight, still more preferably from 0.1 part by weight to 5 parts by weight, particularly preferably from 0.3 part by weight to 4 parts by weight, most preferably from 0.5 part by weight to 3 parts by weight with respect to 100 parts by weight of the base polymer. When the content of the azole-based rust inhibitor (e.g., the benzotriazole-based rust inhibitor) in the pressure-sensitive adhesive composition (C-b) falls within the range, the double-sided pressure-sensitive adhesive tape of the present invention can express more excellent oil resistance.

The pressure-sensitive adhesive composition (C-b) may contain a rust inhibitor except the azole-based rust inhibitor. The number of kinds of the rust inhibitors except the azole-based rust inhibitor (non-azole-based rust inhibitors) may be only one, or may be two or more. Specific examples of such rust inhibitor except the azole-based rust inhibitor include an amine compound, a nitrite, ammonium benzoate, ammonium phthalate, ammonium stearate, ammonium palmitate, ammonium oleate, ammonium carbonate, dicyclohexylamine benzoate, urea, urotropine, thiourea, phenyl carbamate, and cyclohexylammonium-N-cyclohexyl carbamate (CHC). Examples of the amine compound include: hydroxy group-containing amine compounds, such as 2-amino-2-methyl-1-propanol, monoethanolamine, monoisopropanolamine, diethylethanolamine, ammonia, and ammonia water; cyclic amines, such as morpholine; cyclic alkylamine compounds, such as cyclohexylamine; and linear alkylamines, such as 3-methoxypropylamine. Examples of the nitrite include dicyclohexylammonium nitrite (DICHAN), diisopropylammonium nitrite (DIPAN), sodium nitrite, potassium nitrite, and calcium nitrite.

The pressure-sensitive adhesive composition (C-b) may contain a cross-linking agent. When the pressure-sensitive adhesive composition (C-b) contains the cross-linking agent, the double-sided pressure-sensitive adhesive tape of the present invention can express more excellent oil resistance.

Any appropriate cross-linking agent may be adopted as the cross-linking agent to such an extent that the effects of the present invention are not impaired. Examples of such cross-linking agent include an isocyanate-based cross-linking agent and a non-isocyanate-based cross-linking agent. The number of kinds of the cross-linking agents may be only one, or may be two or more.

Any appropriate isocyanate-based cross-linking agent may be adopted as the isocyanate-based cross-linking agent to such an extent that the effects of the present invention are not impaired. Examples of such isocyanate-based cross-linking agent include an aromatic diisocyanate, an aliphatic diisocyanate, and an alicyclic diisocyanate, and dimers and trimers of those diisocyanates. Specific examples thereof include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatomethyl)cyclohexane, methylcyclohexane diisocyanate, and m-tetramethylxylylene diisocyanate, and dimers and trimers thereof, and polyphenylmethane polyisocyanate. In addition, the trimer may be of, for example, an isocyanurate type, a biuret type, or an allophanate type.

A commercial product may be used as the isocyanate-based cross-linking agent. Examples of a commercial product of the polyisocyanate include a product available under the product name "TAKENATE 600" from Mitsui Chemicals, Inc., a product available under the product name "DURANATE TPA100" from Asahi Kasei Chemicals Corporation, and products available under the product names "CORONATE L", "CORONATE HL", "CORONATE HK", "CORONATE HX", and "CORONATE 2096" from Nippon Polyurethane Industry Co., Ltd.

Examples of the non-isocyanate-based cross-linking agent include an epoxy-based cross-linking agent, an oxazoline-based cross-linking agent, an aziridine-based cross-linking agent, a melamine-based cross-linking agent, a carbodiimide-based cross-linking agent, a hydrazine-based cross-linking agent, an amine-based cross-linking agent, a peroxide-based cross-linking agent, a metal chelate-based cross-linking agent, a metal alkoxide-based cross-linking agent, a metal salt-based cross-linking agent, and a silane coupling agent.

In one preferred embodiment, the epoxy-based cross-linking agent may be adopted as the non-isocyanate-based cross-linking agent. The epoxy-based cross-linking agent is preferably, for example, a compound having 2 or more epoxy groups in a molecule thereof, and is more preferably, for example, an epoxy-based cross-linking agent having 3 to 5 epoxy groups in a molecule thereof.

Specific examples of the epoxy-based cross-linking agent include N,N,N',N'-tetraglycidyl-m-xylenediamine, 1,3-bis (N,N-diglycidylaminomethyl)cyclohexane, 1,6-hexanediol diglycidyl ether, polyethylene glycol diglycidyl ether, and polyglycerol polyglycidyl ether. Examples of a commercial product of the epoxy-based cross-linking agent include products available under the product names "TETRAD-C" and "TETRAD-X" from Mitsubishi Gas Chemical Company, a product available under the product name "EPICLON CR-5L" from DIC Corporation, a product available under the product name "DENACOL EX-512" from Nagase ChemteX Corporation, and a product available under the product name "TEPIC-G" from Nissan Chemical Industries, Ltd.

The content of the cross-linking agent in the pressure-sensitive adhesive composition (C-b) is preferably from 0.01 part by weight to 10 parts by weight, more preferably from 0.1 part by weight to 8 parts by weight, still more preferably from 0.5 part by weight to 7 parts by weight, particularly preferably from 1.5 parts by weight to 3 parts by weight with respect to 100 parts by weight of the base polymer. When the content of the cross-linking agent in the pressure-sensitive adhesive composition (C-b) falls within the range, the double-sided pressure-sensitive adhesive tape of the present invention can express more excellent oil resistance.

In the pressure-sensitive adhesive composition (C-b), the isocyanate-based cross-linking agent and the non-isocyanate-based cross-linking agent (e.g., the epoxy-based cross-linking agent) may be used in combination. In this case, the ratio of the content of the non-isocyanate-based cross-linking agent in the pressure-sensitive adhesive composition (C-b) to the content of the isocyanate-based cross-linking agent therein is preferably 1/50 or less, more preferably 1/75 or less, still more preferably 1/100 or less, particularly preferably 1/150 or less because the double-sided pressure-sensitive adhesive tape of the present invention can express more excellent oil resistance. In addition, the ratio of the content of the non-isocyanate-based cross-linking agent in the pressure-sensitive adhesive composition (C-b) to the content of the isocyanate-based cross-linking agent therein is preferably 1/1,000 or more, more preferably 1/500 or more because the double-sided pressure-sensitive adhesive tape of the present invention can express more excellent oil resistance.

The pressure-sensitive adhesive composition (C-b) may contain a tackifying resin. The number of kinds of the tackifying resins may be only one, or may be two or more. Any appropriate tackifying resin may be adopted as the tackifying resin to such an extent that the effects of the present invention are not impaired. Examples of such tackifying resin include a phenol-based tackifying resin, a terpene-based tackifying resin, a modified terpene-based tackifying resin, a rosin-based tackifying resin, a hydrocarbon-based tackifying resin, an epoxy-based tackifying resin, a polyamide-based tackifying resin, an elastomer-based tackifying resin, and a ketone-based tackifying resin.

Examples of the phenol-based tackifying resin include a terpene-phenol resin, a hydrogenated terpene-phenol resin, an alkyl-phenol resin, and a rosin-phenol resin. The terpene-phenol resin refers to a polymer including a terpene residue and a phenol residue, and is a concept including both of a copolymer of a terpene and a phenol compound (terpene-phenol copolymer resin) and a phenol-modified product of a homopolymer or a copolymer of a terpene (phenol-modified terpene resin). Examples of the terpene forming such terpene-phenol resin include monoterpenes, such as α-pinene, β-pinene, and limonene (including a d-form, an l-form, and a d/l-form (dipentene)). The hydrogenated terpene phenol resin refers to a hydrogenated terpene-phenol resin having a structure obtained by hydrogenation of such terpene-phenol resin, and is sometimes referred to as hydrogenated terpene-phenol resin. The alkyl phenol resin is a resin (oil-based phenol resin) obtained from an alkyl phenol and formaldehyde. Examples of the alkyl-phenol resin include novolac-type and resol-type resins. Examples of the rosin-phenol resin include phenol-modified products of rosins or various rosin derivatives (including rosin esters, unsaturated fatty acid-modified rosins, and unsaturated fatty acid-modified rosin esters). The rosin-phenol resin is, for example, a rosin-phenol resin obtained by a method involving adding phenol to the rosins or the various rosin derivatives with an acid catalyst, and thermally polymerizing the resultant.

Examples of the terpene-based tackifying resin include polymers of terpenes, such as α-pinene, β-pinene, d-limonene, l-limonene, and dipentene (typically monoterpenes). A homopolymer of one kind of terpene is, for example, an α-pinene polymer, a β-pinene polymer, or a dipentene polymer.

Examples of the modified terpene resin include a styrene-modified terpene resin and a hydrogenated terpene resin.

The concept of the rosin-based tackifying resin includes both of the rosins and rosin derivative resins. Examples of the rosins include: unmodified rosins (raw rosins), such as gum rosin, wood rosin, and tall oil rosin; and modified rosins obtained by modifying these unmodified rosins through hydrogenation, disproportionation, polymerization, or the like (e.g., a hydrogenated rosin, a disproportionated rosin, a polymerized rosin, and any other chemically modified rosin).

Examples of the rosin derivative resins include: rosin esters, such as unmodified rosin esters that are esters of the unmodified rosins and alcohols, and modified rosin esters that are esters of the modified rosins and alcohols; unsaturated fatty acid-modified rosins obtained by modifying the rosins with unsaturated fatty acids; unsaturated fatty acid-modified rosin esters obtained by modifying the rosin esters with unsaturated fatty acids; rosin alcohols obtained by subjecting carboxy groups of the rosins or the rosin derivative resins (e.g., the rosin esters, the unsaturated fatty acid-modified rosins, and the unsaturated fatty acid-modified rosin esters) to reduction treatments; and metal salts thereof. Examples of the rosin esters include methyl esters, triethylene glycol esters, glycerin esters, and pentaerythritol esters of unmodified rosins or modified rosins (e.g., a hydrogenated rosin, a disproportionated rosin, and a polymerized rosin).

Examples of the hydrocarbon-based tackifying resin include an aliphatic hydrocarbon resin, an aromatic hydrocarbon resin, an aliphatic cyclic hydrocarbon resin, an aliphatic-aromatic petroleum resin (e.g., a styrene-olefin-based copolymer), an aliphatic-alicyclic petroleum resin, a hydrogenated hydrocarbon resin, a coumarone-based resin, and a coumarone-indene-based resin.

The content of the tackifying resin in the pressure-sensitive adhesive composition (C-b) is preferably from 1 part by weight to 50 parts by weight, more preferably from 5 parts by weight to 30 parts by weight, still more preferably from 8 parts by weight to 25 parts by weight, particularly preferably from 10 parts by weight to 20 parts by weight with respect to 100 parts by weight of the base polymer.

The pressure-sensitive adhesive composition (C-b) may contain any appropriate other component to such an extent that the effects of the present invention are not impaired. Examples of such other component include a resin component except the acrylic polymer (P-b), an inorganic filler, an organic filler, metal powder, a pigment, a colorant, a foil-shaped product, a softener, an age resistor, a conductive agent, a UV absorber, an antioxidant, a light stabilizer, a surface lubricant, a leveling agent, a corrosion inhibitor, a heat stabilizer, a polymerization inhibitor, a lubricant, a solvent, and a catalyst.

<<B. Method of Producing Double-Sided Pressure-Sensitive Adhesive Tape>>

The double-sided pressure-sensitive adhesive tape of the present invention may be produced by any appropriate method to such an extent that the effects of the present invention are not impaired. When the double-sided pressure-sensitive adhesive tape of the present invention includes a plurality of pressure-sensitive adhesive layers, the following method is given as an example thereof: the respective pressure-sensitive adhesive layers are separately prepared, and are bonded to each other by any appropriate method. When a case in which the double-sided pressure-sensitive adhesive tape of the present invention is formed of 3 pressure-sensitive adhesive layers having the construction "pressure-sensitive adhesive layer (B)/pressure-sensitive adhesive layer (A)/pressure-sensitive adhesive layer (B)" is taken as an example, a method involving bonding the 2 respective pressure-sensitive adhesive layers (B) to both surfaces of the pressure-sensitive adhesive layer (A) is given as an example thereof. For example, a laminator may be used in the bonding. In addition, after the bonding, aging may be performed as required under any appropriate temperature for any appropriate time period.

EXAMPLES

Now, the present invention is described specifically by way of Examples. However, the present invention is by no means limited to Examples. Test and evaluation methods in Examples and the like are as described below. The term "part(s)" in the following description means "part(s) by weight" unless otherwise specified, and the term "%" in the following description means "wt %" unless otherwise specified.

<Local Maximum Value of Loss Tangent Tan δ and Temperature at which the Local Maximum Value is Obtained>

Double-sided pressure-sensitive adhesive tapes superimposed on each other to have a thickness of 1 mm (when the thickness did not become just 1 mm, a thickness as close to 1 mm as possible) were punched into a disc shape having a diameter of 7.9 mm to provide an evaluation sample. The evaluation sample was sandwiched between parallel plates, and its storage modulus of elasticity G' and loss modulus of elasticity G" were measured in the temperature region of from −70° C. to 150° C. at a rate of temperature increase of 5° C./min by a shear mode while shear strain having a frequency of 1 Hz was applied to the sample with a viscoelasticity tester (manufactured by TA Instruments Japan Inc., model name: "ARES"). Next, the loss tangent tan δ of the sample was calculated from the equation "tan δ=G"/G'", and the local maximum value of the loss tangent tan δ and the temperature at which the local maximum value was obtained (temperature at which a tan δ curve showed a local maximum) were determined by plotting the temperature dependence of the loss tangent.

<Impact Resistance>

A double-sided pressure-sensitive adhesive tape sandwiched between separators was punched into a frame shape having a width of 1 mm and an outer shape of 24.5-millimeter square to provide an evaluation sample. The evaluation sample was arranged between a square stainless-steel plate having a thickness of 2.0 mm and an outer shape measuring 50 mm by 50 mm, the plate having a hole opened in its central portion, and a circular stainless-steel plate (having an outer diameter of 50 mm and a thickness of 2 mm), and was crimped onto the plates (500 g×15 seconds) so that a force was uniformly applied to the sample in the gravity direction. After that, the resultant was left at rest under 50° C. for 3 hours and taken out. After that, the resultant was returned to an environment at 23° C. to provide a test piece. A U-shaped measuring stand (made of aluminum having a thickness of 5 mm) having a length of 150 mm, a width of 100 mm, and a height of 45 mm was arranged on the pedestal of a Du Pont-type impact tester (manufactured by Tester Sangyo Co., Ltd.), and the test piece was mounted thereon so that the circular plate was on a lower side. A stainless-steel impact shaft (tip diameter: 12.7 mm) having a diameter of 7.5 mm and a weight of 100 g was caused to fall from the circular plate side toward the central portion of the stainless plate as follows: the height of the impact shaft was changed in increments of 10 cm, and the impact shaft was caused to fall from each height at intervals of 10 seconds five times. The height at which the peeling of the tape from the test piece or the breakage of the test piece was observed was measured. A test method was as follows: a verification was performed so that energy increased, and the height was increased at a load of 50 g, and when the height exceeded a height corresponding to the upper limit of the apparatus, the load was changed to 100 g before the height was increased. At this time, no test was performed for energy that had already been evaluated, and the load and the height were set so that the amounts of energy did not overlap each other. After that, energy immediately before the peeling was calculated from the expression "load×height", and was defined as a result.

<Evaluation of Oil-Resistant Pressure-Sensitive Adhesive Property>

A PET film having a thickness of 50 μm was bonded to one pressure-sensitive adhesive layer surface of a double-sided pressure-sensitive adhesive sheet to back the surface. After that, the resultant was cut into a size measuring 10 mm wide by 100 mm long to produce a test piece. A measurement sample was produced by crimping the pressure-sensitive adhesive layer surface of the test piece onto a stainless-steel plate (SUS304BA plate) under an environment at 23° C. and 50% RH. The crimping was performed by reciprocating a 2-kilogram roller once. The produced measurement sample was left to stand under the environment at 23° C. and 50% RH for 30 minutes, and then its peel strength (N/10 mm) was measured with a tensile tester ("PRECISION UNIVERSAL TESTER AUTOGRAPH AG-IS 50N" manufactured by Shimadzu Corporation) in conformity with JIS Z 0237:2000 under the conditions of a tensile rate of 300 mm/min and a peel angle of 180°. The value was defined as a pre-immersion pressure-sensitive adhesive strength.

Meanwhile, a measurement sample produced in the same manner as that described above was left to stand under the environment at 23° C. and 50% RH for 30 minutes. After that, the sample was immersed in an oleic acid bath, and was held under an environment at 40° C. and 90% RH for 12 hours. After that, the measurement sample was pulled up from the oleic acid bath, and oleic acid adhering to its periphery was lightly wiped off. The sample was left to stand under the environment at 23° C. and 50% RH for 30 minutes, and then its peel strength (N/10 mm) was measured in the same manner as in the pre-immersion pressure-sensitive adhesive strength. The value was defined as a post-immersion pressure-sensitive adhesive strength.

A pressure-sensitive adhesive strength maintenance ratio was calculated from the measured values thus obtained by using the following equation.

Pressure-sensitive adhesive strength maintenance ratio (%)=(post-immersion pressure-sensitive adhesive strength/pre-immersion pressure-sensitive adhesive strength)×100

[Production Example 1]: Production of Pressure-Sensitive Adhesive Layer (1)

95 Parts of butyl acrylate and 5 parts of acrylic acid serving as monomer components, and 233 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.2 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 700,000.

0.8 Part of 1,2,3-benzotriazole (product name: "BT-120", manufactured by Johoku Chemical Co., Ltd.), 20 parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 2 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.01 part of an epoxy-based cross-linking agent (product name: "TETRAD-C", 1,3-bis(N,N-diglycidyl aminomethyl)cyclohexane, manufactured by Mitsubishi Gas Chemical Company, Inc.) serving as cross-linking agents, and 1 part of a black pigment (product name: "AT DN101 BLACK", manufactured by Dainichiseika Color & Chemicals Mfg. Co., Ltd.) with respect to 100 parts of the acrylic polymer in the resultant acrylic polymer solution were added to the solution, and the contents were stirred and mixed to prepare a pressure-sensitive adhesive composition (1).

The pressure-sensitive adhesive composition (1) was applied to the release surface of a polyester release liner having a thickness of 38 µm (product name: "DIAFOIL MRF", manufactured by Mitsubishi Polyester Film, Inc.), and was dried at 100° C. for 2 minutes to form a pressure-sensitive adhesive layer (1) having a thickness of 25 µm.

[Production Example 2]: Production of Pressure-Sensitive Adhesive Layer (2)

A liquid monomer mixture (monomer composition) obtained by mixing 57 parts of butyl acrylate, 12 parts of cyclohexyl acrylate, 23 parts of 4-hydroxybutyl acrylate, and 8 parts of 2-hydroxyethyl acrylate serving as monomer components was compounded with 0.08 part of 2,2-dimethoxy-1,2-diphenylethan-1-one (product name: "IRGACURE 651", manufactured by BASF Japan Ltd.) and 0.09 part of 1-hydroxycyclohexyl phenyl ketone (product name: "IRGACURE 184", manufactured by BASF Japan Ltd.) serving as photopolymerization initiators, and 0.19 part of dipentaerythritol pentaacrylate (product name: "KAYARAD DPHA", manufactured by Nippon Kayaku Co., Ltd.). After that, the resultant was irradiated with UV light until its viscosity (BH viscometer No. 5 rotor, 10 rpm, measurement temperature: 30° C.) became about 15 Pa·s. Thus, a pressure-sensitive adhesive composition (2) containing a partial polymer (polymerization ratio: about 10%) obtained by the polymerization of part of the monomer components was obtained. One surface of a polyester film having a thickness of 38 µm (product name: "DIAFOIL MRF", manufactured by Mitsubishi Plastics, Inc.) was subjected to a release treatment with silicone, and the pressure-sensitive adhesive composition (2) was applied to the release-treated surface so that its final thickness became 150 µm. Thus, an applied layer was formed. Next, the surface of the formed applied layer was covered with a polyester film having a thickness of 38 µm (product name: "DIAFOIL MRE", manufactured by Mitsubishi Plastics, Inc.) one surface of which had been subjected to a release treatment with silicone so that the release-treated surface of the polyester film was on the applied layer side. Thus, the applied layer was blocked from oxygen. A sheet having the applied layer thus obtained was irradiated with UV light having an irradiance of 5 mW/cm$^2$ by using a chemical light lamp (manufactured by Toshiba Corporation) so that the applied layer was cured. Thus, a pressure-sensitive adhesive layer (2) was formed. The intensity of the UV light was measured with TOPCON UVR-T1 having the maximum sensitivity at about 350 nm. The polyester films covering both surfaces of the pressure-sensitive adhesive layer (2) each function as a release liner.

[Production Example 3]: Production of Pressure-Sensitive Adhesive Layer (3)

A liquid monomer mixture (monomer composition) obtained by mixing 65 parts of butyl acrylate, 10 parts of cyclohexyl acrylate, 19 parts of 4-hydroxybutyl acrylate, and 6 parts of 2-hydroxyethyl acrylate serving as monomer components was compounded with 0.08 part of 2,2-dimethoxy-1,2-diphenylethan-1-one (product name: "IRGACURE 651", manufactured by BASF Japan Ltd.) and 0.09 part of 1-hydroxycyclohexyl phenyl ketone (product name: "IRGACURE 184", manufactured by BASF Japan Ltd.) serving as photopolymerization initiators, and 0.19 part of dipentaerythritol pentaacrylate (product name: "KAYARAD DPHA", manufactured by Nippon Kayaku Co., Ltd.). After that, the resultant was irradiated with UV light until its viscosity (BH viscometer No. 5 rotor, 10 rpm, measurement temperature: 30° C.) became about 15 Pa·s. Thus, a pressure-sensitive adhesive composition (3) containing a partial polymer (polymerization ratio: about 10%) obtained by the polymerization of part of the monomer components was obtained. A pressure-sensitive adhesive layer (3) was formed in the same manner as in Production Example 2 by using the resultant pressure-sensitive adhesive composition (3).

[Production Example 4]: Production of Pressure-Sensitive Adhesive Layer (4)

A pressure-sensitive adhesive layer (4) was formed in the same manner as in Production Example 1 except that 1,2,3-benzotriazole was not used.

[Production Example 5]: Production of Pressure-Sensitive Adhesive Layer (5)

A liquid monomer mixture (monomer composition) obtained by mixing 78 parts of 2-ethylhexyl acrylate, 18 parts of N-vinyl-2-pyrrolidone, and 4 parts of 2-hydroxyethyl acrylate serving as monomer components was compounded with 0.05 part of 2,2-dimethoxy-1,2-diphenylethan-1-one (product name: "IRGACURE 651", manufactured by BASF Japan Ltd.) and 0.05 part of 1-hydroxycyclohexyl phenyl ketone (product name: "IRGACURE 184", manufactured by BASF Japan Ltd.) serving as photopolymerization initiators. After that, the resultant was irradiated with UV light until its viscosity (BH viscometer No. 5 rotor, 10 rpm, measurement temperature: 30° C.) became about 15 Pa·s. Thus, a syrup containing a partial polymer (polymerization ratio: about 10%) obtained by the polymerization of part of the monomer components was obtained.

4 Parts of acrylic acid and 0.07 part of 1,6-hexanediol diacrylate were added to 100 parts of the resultant syrup. Thus, a mixture was obtained. Further, 0.7 part of 2,2-dimethoxy-1,2-diphenylethan-1-one (product name: "IRGACURE 651", manufactured by BASF Japan Ltd.) serving as an additional photopolymerization initiator and 1 part of a black pigment (product name: "AT DN101 BLACK", manufactured by Dainichiseika Color & Chemicals Mfg. Co., Ltd.) were added to the resultant mixture, and the contents were sufficiently mixed to provide a pressure-sensitive adhesive composition (5). A pressure-sensitive adhesive layer (5) was formed in the same manner as in Production Example 2 by using the pressure-sensitive adhesive composition (5).

[Production Example 6]: Production of Pressure-Sensitive Adhesive Layer (6)

(Production of Acrylic Polymer (P))

60 Parts of dicyclopentanyl acrylate (DCPMA), 40 parts of methyl methacrylate (MMA), 3.5 parts of α-thioglycerol serving as a chain transfer agent, and 100 parts of toluene serving as a polymerization solvent were loaded into a four-necked flask, and were stirred under a nitrogen atmosphere at 70° C. for 1 hour. Next, 0.2 part of 2,2'-azobisisobutyronitrile serving as a polymerization initiator was loaded into the four-necked flask, and the mixture was subjected to a reaction at 70° C. for 2 hours, and was subsequently subjected to a reaction at 80° C. for 2 hours. After that, the reaction liquid was loaded into an atmosphere having a temperature of 130° C., and toluene, the chain transfer agent, and the unreacted monomers were dried and removed. Thus, a solid acrylic polymer (P) was obtained. The acrylic polymer (P) had a weight-average molecular weight of $5.1 \times 10^3$.

(Production of Pressure-Sensitive Adhesive Layer (6))

A monomer mixture (monomer composition) including 68 parts of 2-ethylhexyl acrylate (2EHA), 14.5 parts of N-vinyl-2-pyrrolidone (NVP), and 17.5 parts of 2-hydroxyethyl acrylate (HEA) was compounded with 0.035 part of 2,2-dimethoxy-1,2-diphenylethan-1-one (product name: "IRGACURE 651", manufactured by BASF Japan Ltd.) and 0.035 part of 1-hydroxycyclohexyl phenyl ketone (product name: "IRGACURE 184", manufactured by BASF Japan Ltd.) serving as photopolymerization initiators. After that, the resultant was irradiated with UV light until its viscosity (BH viscometer No. 5 rotor, 10 rpm, measurement temperature: 30° C.) became about 20 Pa·s. Thus, a prepolymer composition in which part of the monomer components were polymerized was obtained. Next, 5 parts of the acrylic polymer (P) obtained in the foregoing, 0.150 part of hexanediol diacrylate (HDDA), and 0.3 part of a silane coupling agent (product name: "KBM-403", manufactured by Shin-Etsu Chemical Co., Ltd.) were added to the resultant prepolymer composition, and the contents were mixed to provide a pressure-sensitive adhesive composition (6). The resultant pressure-sensitive adhesive composition (6) was applied onto a polyethylene terephthalate (PET) separator (product name: "MRF50", manufactured by Mitsubishi Plastics, Inc.) so that its final thickness (the thickness of a pressure-sensitive adhesive layer to be obtained) became 150 μm. Thus, an applied layer was formed. Next, a PET separator (product name: "MRF38", manufactured by Mitsubishi Plastics, Inc.) was arranged on the formed applied layer to cover the applied layer so that the layer was blocked from oxygen. Thus, a laminate "MRF50/applied layer/MRF38" was obtained. Next, the laminate was irradiated with UV light having an irradiance of 5 mW/cm$^2$ from the upper surface (MRF38 side) of the laminate for 300 seconds by using a black light (manufactured by Toshiba Corporation). Further, a drying treatment was performed with a dryer at 90° C. for 2 minutes to volatilize the remaining monomers. Thus, a pressure-sensitive adhesive layer (6) was formed. The PET separators covering both surfaces of the pressure-sensitive adhesive layer (6) each function as a release liner.

Example 1

The 2 respective pressure-sensitive adhesive layers (1) were bonded to a first surface and a second surface exposed by sequentially releasing the release liners of the pressure-sensitive adhesive layer (2). The release liners arranged on the pressure-sensitive adhesive layers (1) were left as they were on the pressure-sensitive adhesive layers (1) to be used for the protection of the surfaces of the pressure-sensitive adhesive layers (1). The resultant structural body was passed through a laminator (0.3 MPa, speed: 0.5 m/min) at room temperature once, and was then aged in an oven at 50° C. for 1 day. Thus, as shown in Table 1, a double-sided pressure-sensitive adhesive tape (1) (construction: pressure-sensitive adhesive layer (1)/pressure-sensitive adhesive layer (2)/pressure-sensitive adhesive layer (1)) was obtained.

The results of the evaluations of the tape are shown in Table 2.

Examples 2 and 3, and Comparative Examples 1 to 4

Double-sided pressure-sensitive adhesive tapes (2) and (3) and (C1) to (C4) were each obtained in the same manner as in Example 1 except that the construction of Example 1 was changed to a construction shown in Table 1.

The results of the evaluations of the tapes are shown in Table 2.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Construction | First layer | Pressure-sensitive adhesive layer (1) | Pressure-sensitive adhesive layer (1) | Pressure-sensitive adhesive layer (4) | Pressure-sensitive adhesive layer (1) | Pressure-sensitive adhesive layer (1) | Pressure-sensitive adhesive layer (1) | Pressure-sensitive adhesive layer (2) |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| Second layer | Pressure-sensitive adhesive layer (2) | Pressure-sensitive adhesive layer (3) | Pressure-sensitive adhesive layer (3) | Pressure-sensitive adhesive layer (5) | Pressure-sensitive adhesive layer (6) | | |
| Third layer | Pressure-sensitive adhesive layer (1) | Pressure-sensitive adhesive layer (1) | Pressure-sensitive adhesive layer (4) | Pressure-sensitive adhesive layer (1) | Pressure-sensitive adhesive layer (1) | | |

TABLE 2

|  |  | Example 1 | Example 2 | Example 3 | Comparative Example 1 | Comparative Example 2 | Comparative Example 3 | Comparative Example 4 |
|---|---|---|---|---|---|---|---|---|
| Loss tangent tan δ | Local maximum value | 2.14 | 2.13 | 2.14 | 1.28 | 1.46 | 1.82 | 2.35 |
| | Temperature at which local maximum value is obtained (° C.) | −19 | −23 | −23 | −7 | −10 | −9 | −21 |
| Impact resistance (J) | | 0.55 | 0.71 | 0.68 | 0.34 | 0.4 | 0.11 | 0.28 |
| Oil-resistant pressure-sensitive adhesive property (%) | | 89 | 86 | 87 | 77 | 73 | 72 | 60 |

The double-sided pressure-sensitive adhesive tape of the present invention can be suitably used for the inside of a mobile device or the like.

What is claimed is:

1. A double-sided pressure-sensitive adhesive tape, which has a local maximum value of a loss tangent tan δ of 1.5 or more, and a temperature, at which the local maximum value is obtained, of from −30° C. to 0° C.,
    wherein the double-sided pressure-sensitive adhesive tape comprises a plurality of pressure-sensitive adhesive layers,
    wherein the double-sided pressure-sensitive adhesive tape comprises a pressure-sensitive adhesive layer (A) formed from a pressure-sensitive adhesive composition (C-a) containing, as a base polymer, an acrylic polymer (P-a) obtained by polymerizing monomer components (M-a) containing an alicyclic structure-containing acrylic monomer, an alkyl (meth)acrylate having an alkyl group having 4 to 18 carbon atoms at an ester terminal thereof, and a hydroxy group-containing monomer as an essential component,
    wherein a content of the alicyclic structure-containing acrylic monomer in the monomer components (M-a) is from 1 wt % to 30 wt %,
    wherein a content of the alkyl (meth)acrylate having an alkyl group having 4 to 18 carbon atoms at an ester terminal thereof in the monomer components (M-a) is from 30 wt % to 70 wt %,
    wherein a content of the hydroxy group-containing monomer in the monomer components (M-a) is from 5 wt % to 50 wt %, and
    wherein the double-sided pressure-sensitive adhesive tape has a thickness of 100 μm or more and 300 μm or less.

2. The double-sided pressure-sensitive adhesive tape according to claim 1, wherein the double-sided pressure-sensitive adhesive tape comprises 3 or more pressure-sensitive adhesive layers, and the pressure-sensitive adhesive layer (A) is formed as a layer excluding an outermost layer.

3. The double-sided pressure-sensitive adhesive tape according to claim 1, wherein the double-sided pressure-sensitive adhesive tape comprises a pressure-sensitive adhesive layer (B) formed from a pressure-sensitive adhesive composition (C-b) containing, as a base polymer, an acrylic polymer (P-b) obtained by polymerizing monomer components (M-b) containing an alkyl (meth)acrylate as an essential component.

4. The double-sided pressure-sensitive adhesive tape according to claim 3, wherein a content of the alkyl (meth)acrylate in the monomer components (M-b) is from 30 wt % to 90 wt %.

5. The double-sided pressure-sensitive adhesive tape according to claim 3, wherein the alkyl (meth)acrylate comprises butyl acrylate.

6. The double-sided pressure-sensitive adhesive tape according to claim 3, wherein the double-sided pressure-sensitive adhesive tape comprises 3 or more pressure-sensitive adhesive layers, and the pressure-sensitive adhesive layer (B) is formed as an outermost layer.

* * * * *